United States Patent [19]
Gay et al.

[11] Patent Number: 5,013,492
[45] Date of Patent: May 7, 1991

[54] ARRANGEMENT FOR CONTACT BODIES FOR LIQUID AND GAS

[75] Inventors: George A. Gay, Califon, N.J.; Robert H. Miller, Fort Myers, Fla.

[73] Assignee: Munters Corporation, Fort Myers, Fla.

[21] Appl. No.: 505,561

[22] Filed: Apr. 6, 1990

[51] Int. Cl.$^5$ .............................. B01F 3/04
[52] U.S. Cl. .................................. 261/112.2
[58] Field of Search ......................... 261/112.2

[56] References Cited

U.S. PATENT DOCUMENTS

| | | | |
|---|---|---|---|
| 3,526,393 | 9/1970 | Meek | 261/112.2 |
| 3,738,626 | 6/1973 | Norback | 261/112.2 |
| 3,785,620 | 1/1974 | Huber | 261/112.2 |

Primary Examiner—Tim Miles
Attorney, Agent, or Firm—Pasquale A. Razzano

[57] ABSTRACT

A contact body for liquid and gas, primarily for cooling towers, the body comprising at least two separate contact body packs supported one upon the other and defining an interface therebetween, the packs each being formed of a plurality of formed sheets positioned in contact with each other and defining passages therebetween. The packs are positioned such that their sheets extend at an angle to one another; the sheets in the packs each having edge portions at the interface, and selected sheets in each pack having their edge portions at the interface offset with respect to the remaining sheets, whereby enlarged passageway segments are formed at the interface.

6 Claims, 3 Drawing Sheets

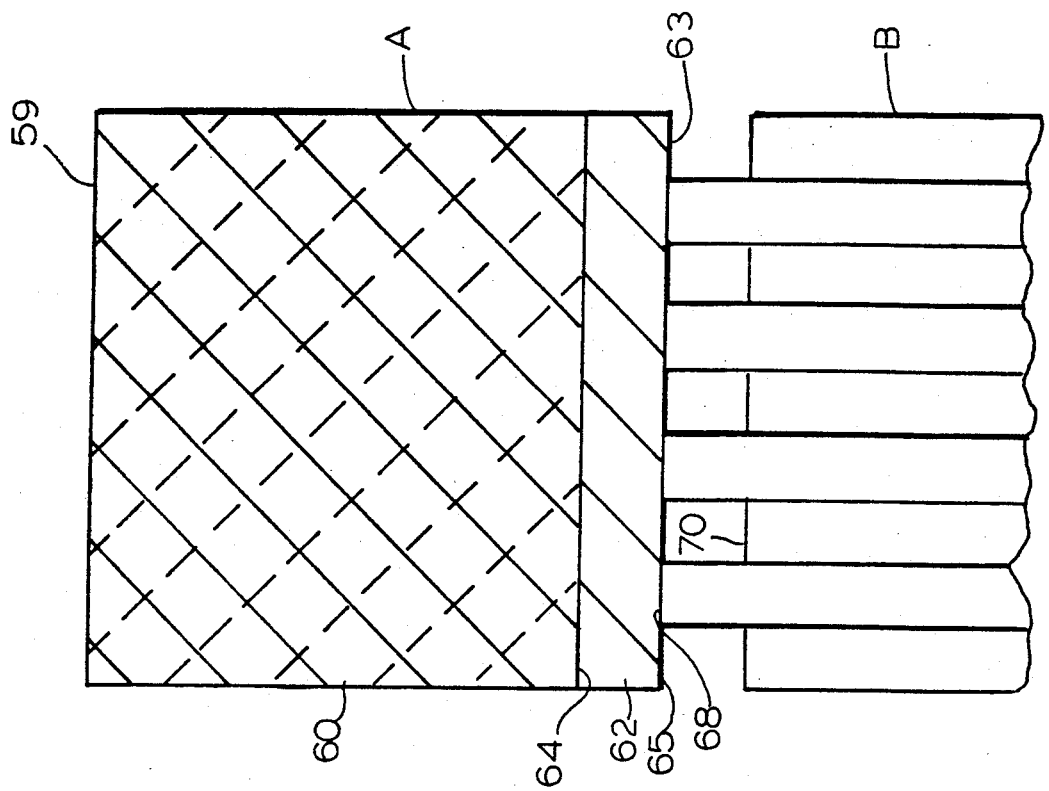
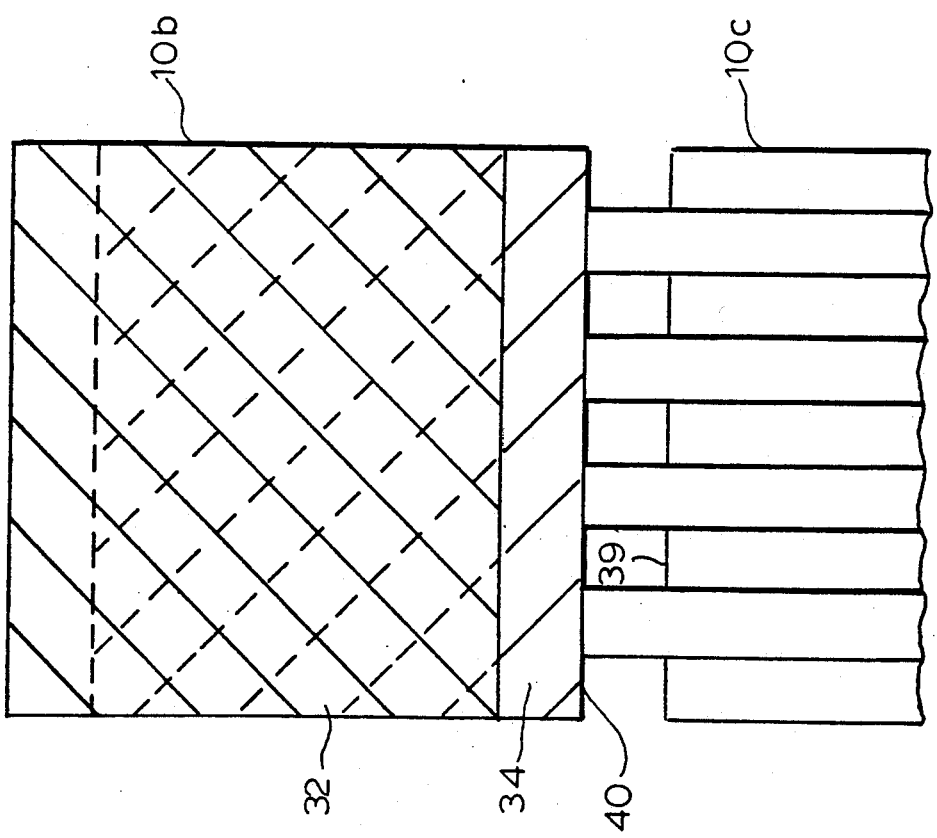

ARRANGEMENT FOR CONTACT BODIES FOR LIQUID AND GAS

BACKGROUND OF THE INVENTION

1. Field of the Invention

The invention relates generally to the art of contact body elements for gas and liquid contact apparatus, and more particularly, to an improvement to the stacking of contact bodies consisting of stacks of formed sheets. The improvement includes having adjacent sheets in the contact body offset from one another and supported on a contact body therebelow. This arrangement produces a larger space at the interface between stacked contact bodies so that the possibility of the passageways at such interface being blocked is reduced.

2. Description of the Art

It is known in the art to provide liquid-gas contact bodies which consist of formed layers of sheet material. For example, the sheets may be corrugated or folded, with folds in adjacent layers crossing one another. In large installations, these contact bodies are stacked one upon the other, usually with the sheets of one body positioned transversely to the sheets of the adjacent body. Such previously proposed contact bodies were formed of sheets having generally the same dimensions with their upper and lower edges all lying in the same plane. It has been found that such an arrangement causes restrictions at the interface between adjacent bodies. This results in stagnation of the liquid at the interface and deposition of solids suspended in the liquid at the interface which tend to block liquid and gas flow. This causes further stagnation of the liquid and clogging.

In has previously been proposed to prevent clogging at the bottom face of a single gas contact body at which air enters by providing adjacent sheets in pairs and cut obliquely at their edges so as together to form an inverted V viewed in the surface extension of the layers. A formed layer or sheet having a transversely cut straight lower edge is located between each such pair and extends downwards for a distance below the layers having the obliquely cut edges. This arrangement, shown in U.S. Pat. No. 3,738,626, has proved complicated to manufacture as well as expensive, because layers are cut both obliquely and transversely depending on their position.

Other attempts in reducing such an overbridging by water include increasing the height of the folds or corrugation of the layers, but then the capacity of the contact body within a certain volume is deteriorated to the same degree.

OBJECTS AND SUMMARY OF THE INVENTION

Therefore, it is a general object of the present invention to provide a stacking arrangement for the sheets of a contact body which avoids the above-described difficulties of the prior art.

It is another object of this invention to improve the arrangement of the formed contact body layers to avoid clogging in the channels therebetween, and thereby reduce cost of operation and increase the capacity of the cooling tower.

It is also an object of the invention to provide a stacking arrangement for the formed sheets of a contact body which includes having adjacent layers offset from one another.

Yet another object of this invention is to provide an improved stacking arrangement for contact body elements which have a life expectancy better than that of presently available cooling tower fill since it is less prone to clogging.

These and other objects of the invention are achieved in the arrangement of the formed sheets of a contact body for use in forming the fill of a gas and liquid contact apparatus which produces interaction between a gas and liquid flowing through the apparatus. The body is composed of formed sheets having corrugations or the like thereon, with alternating sheets being offset with respect to one another. When one contact body thus formed is stacked transversely of another therebelow, the passageways at the interface between contact bodies or packs is enlarged and, thereby, reduces the possible clogging of the packs at the interface.

The above, and other objects, features and advantages of this invention, will be apparent in the following detailed description of an illustrative embodiment thereof which is to be read in connection with the accompanying drawings wherein:

BRIEF DESCRIPTION OF THE DRAWINGS

FIG. 3 is a side view taken along line 3—3 of FIG. 2;

FIG. 5 is a side view taken along line 5—5 of FIG. 4.

DETAILED DESCRIPTION OF THE PREFERRED EMBODIMENT

Figure 1:
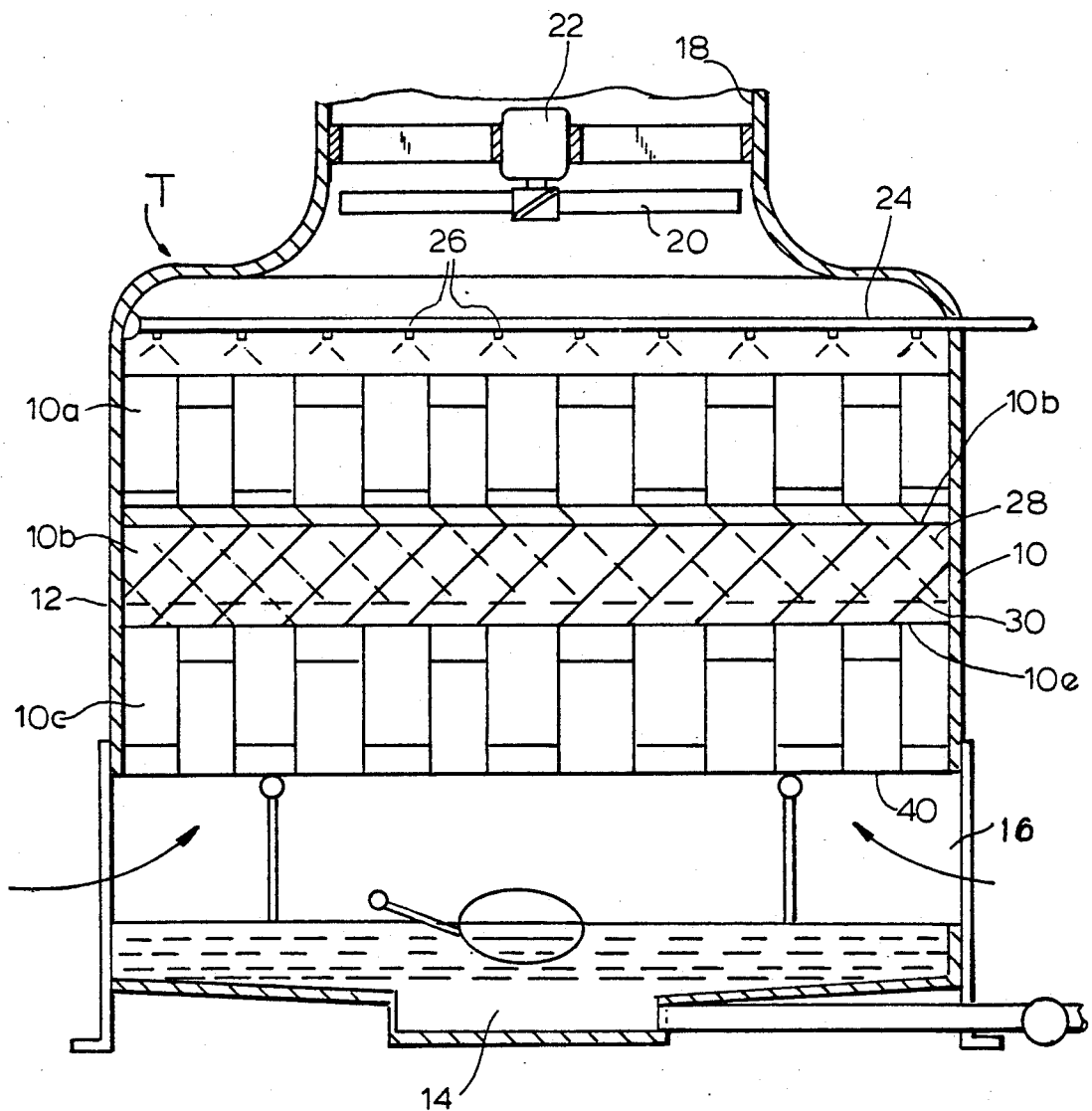
FIG. 1 is an elevational view, in section, of a cooling tower provided with the contact body made according to the invention.

Referring now to the drawing in detail, and initially to FIG. 1, a cooling Tower T is illustrated which includes a contact body 10 mounted in a housing o enclosure 12 whose bottom forms a water collecting basin 14. Below the contact body, casing 14 is formed with openings or apertures 16 for admittance of air which passes in an upward direction through contact body 10 and escapes through an outlet 18 within which a fan 20 with a driving motor 22 is provided. Water is supplied to the contact body 10 from above through a distributor 24 having discharge holes 26 or other water distribution means at its underside.

Figure 2:
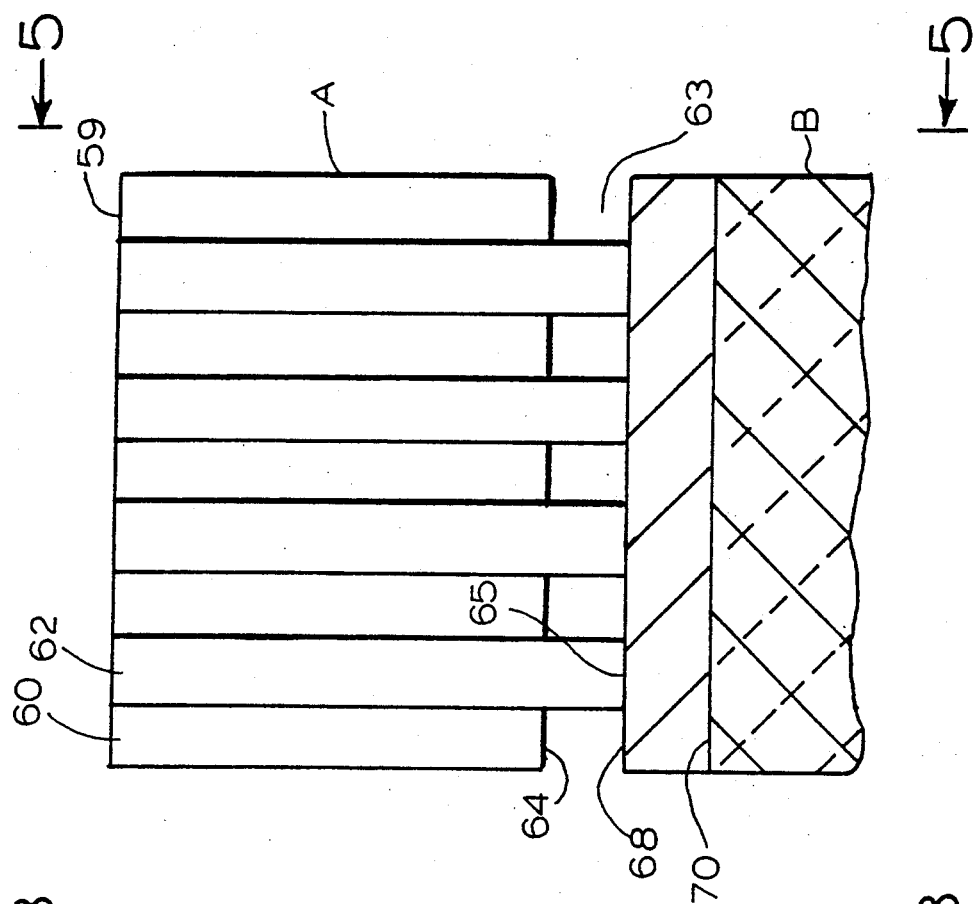
FIG. 2 is an enlarged partial end view of the interface between the middle and lower contact body of FIG. 1.

Contact body 10 is formed of a plurality of individually formed packs or bodies. In the illustrative embodiment three packs, 10a, 10b and 10c, are provided stacked one upon the other. Each pack is formed of a plurality of sheets of formed material such as plastic, fibers of cellulose or an inorganic material such as asbestos. In the illustrative embodiment the sheets are formed with corrugations, although other shapes or forms may be used. As seen in FIGS. 1-3, the folds or corrugations 28, 30 cross one another in adjacent layers with an angle of 45° or less, preferably 30° degrees relative the vertical plane. The layers about against one another and include means e.g. an adhesive, at their points of contact to maintain that relationship. Water and air flow in countercurrent through the passages of the contact body packs defined by the corrugated sheets of the pack. These channels or passages extend from end to end of each pack and are formed in both the horizontal and vertical directions, with continuously varying widths from zero at the places of contact between the sheets to the double height of the folds or corrugations. The height of the folds or corrugations may be, for example, in the range from 5 to 30 millimeters, as is known in the art. The width of the channels varies over the entire surface of the layers between zero and the double height of the folds or corrugations.

Each contact body pack is turned 90° with respect to the pack immediately therebelow. Thus, the sheets in pack 10a extend transversely of the sheets in pack 10b, while the sheets in pack 10b extend transversely of the sheets in pack 10c. As a result of this arrangement, the paths of travel of air and gas in the contact body changes at the interfaces 10d and 10e between the packs. As noted above, with previously proposed contact bodies having uniform sheet edges at such interfaces, clogging could potentially occur.

In accordance with one embodiment of the invention, e.g. as seen in FIG. 2 and 3, the problem of clogging is overcome by positioning the adjacent layers 32 and 34 in each pack, offset from one another. Therefore, lower edges 36, of sheets 32 are spaced from the upper edges 33 of the sheets 32 of the lower contact body, while the lower edge 40 of sheets 34 rest on the upper edges 33 of the sheets 32 therebelow and are spaced from the upper edges 35 of the sheets 34 in the lower contact body or pack. This forms enlarged passage segments 37, 39 between the sheets of the interface between packs. These enlarged segments permit freer passage of liquid as it changes direction at the pack interfaces, thereby avoiding liquid stagnation and undesirable deposits and clogging.

Instead of alternating the sheets, as illustrated in FIG. 2, it is contemplated that only every 3rd or 4th sheet needs to be staggered.

Figure 4:
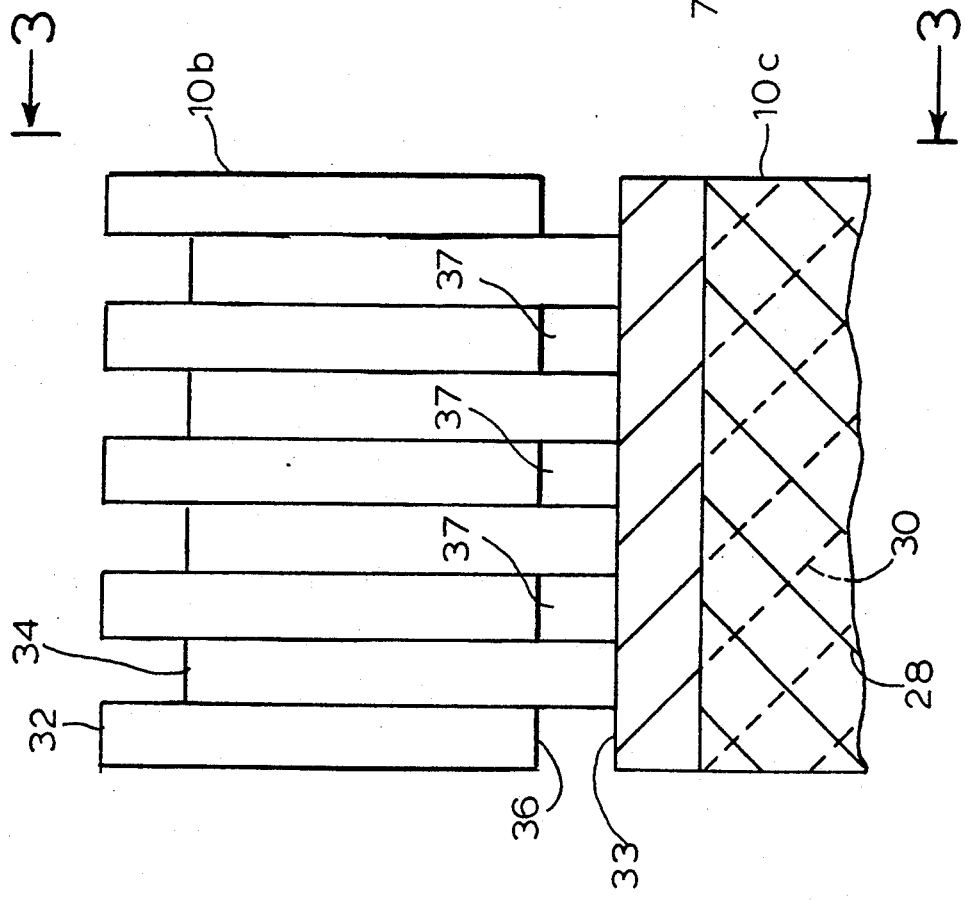
FIG. 4 is a view similar to FIG. 2 of another embodiment of the invention using two fill packs.

Another embodiment of the invention, is illustrated in FIGS. 4-5 which is suitable for towers requiring only two fill packs, one stacked upon the other. In this embodiment, only the edges 64, 65 and 68, 70 respectively, at one side of each packs A and B are alternated with the edges 60, 62 (the other side of second pack is not shown) on their opposite side being in the same plane. These packs A and B are installed so that the total fill depth is made up of two packs, with the lower pack turned so that its alternating layer side 68, 70 is facing upwards against the alternating layer side 64, 65 of the bottom of the upper pack A. This provides the same effect as described above with respect to the embodiment of FIGS. 2 and 3, except that the very bottom of the contact body has all edges of the lower pack in the same plane and thus available to support the weight of the contact body.

Although illustrative embodiments of the invention have been described herein, it is to be understood that the invention is not limited to the foregoing, and that various modifications and changes may be affected therein by one skilled in the art without departing from the scope or spirit of the invention as defined by the appended claims.

What is claimed is:

1. A contact body for liquid and gas, primarily for cooling towers, said body comprising at least two separate contact body packs supported one upon the other and defining an interface therebetween, said packs each being formed of a plurality of formed sheets positioned in contact with each other and defining passages therebetween, said packs being positioned such that their sheets extend at an angle to one another; said sheets in said packs each having edge portions at said interface, and selected sheets in each pack having their edge portions at said interface offset with respect to the remaining sheets, whereby enlarged passageway segments are formed at the interface.

2. A contact body as defined in claim 1 wherein said angle is 90°.

3. A contact body as defined in claim 1 wherein said selected sheets comprise alternate sheets in each pack.

4. A contact body as defined in claim 1 wherein each pack has a side opposite said interface.

5. A contact body as defined in claim 4 wherein said sheets have edges at said opposite side which all lie in the same plane.

6. A contact body as defined in claim 4 wherein said sheets have edges at said opposite side and said selected sheet's edges at said opposite side are offset with respect to the remaining sheets.

* * * * *